United States Patent [19]
Bacon et al.

[11] Patent Number: 5,660,258
[45] Date of Patent: Aug. 26, 1997

[54] TORQUE CONVERTER HAVING TORSIONAL DAMPER

[75] Inventors: Duane A. Bacon, Saline; Gregory A. Phillips, Rochester Hills; Malaiappan Viswanathan, Novi, all of Mich.

[73] Assignee: Borg-Warner Automotive, Inc., Sterling Heights, Mich.

[21] Appl. No.: 620,443

[22] Filed: Mar. 22, 1996

[51] Int. Cl.$^6$ .............................. F16H 45/02; F16D 3/66
[52] U.S. Cl. ..................... 192/3.29; 192/3.28; 192/207; 464/100
[58] Field of Search .................... 192/3.29, 3.28, 192/207, 30 V; 464/81, 82, 84, 100

[56] References Cited

U.S. PATENT DOCUMENTS

| | | |
|---|---|---|
| 1,591,063 | 7/1926 | Smith .......................... 464/81 |
| 1,991,709 | 2/1935 | Spase ........................... 192/207 |
| 3,059,740 | 10/1962 | Roche . |
| 4,240,532 | 12/1980 | Blomquist . |
| 4,289,048 | 9/1981 | Mikel et al. . |
| 4,295,348 | 10/1981 | Helfer et al. ................. 464/100 X |
| 4,437,551 | 3/1984 | Gimmler et al. . |
| 4,638,897 | 1/1987 | Nishimura . |
| 4,646,886 | 3/1987 | Nishimura . |
| 4,895,232 | 1/1990 | Kobayashi . |
| 4,909,362 | 3/1990 | Miura et al. . |
| 4,926,988 | 5/1990 | Kundermann . |
| 4,987,981 | 1/1991 | Casse et al. . |
| 5,070,974 | 12/1991 | Kirkwood . |
| 5,462,145 | 10/1995 | Gimmler . |
| 5,466,195 | 11/1995 | Nogle et al. . |
| 5,477,950 | 12/1995 | Maloof . |
| 5,553,693 | 9/1996 | Schoder et al. .............. 192/3.29 |

FOREIGN PATENT DOCUMENTS 534955   10/1931   Germany ........................ 464/81

*Primary Examiner*—Rodney H. Bonck
*Attorney, Agent, or Firm*—Bliss McGlynn, P.C.; Greg Dziegielewski, Esq.

[57] ABSTRACT

A torque converter for translating torque from a prime mover to an input shaft of a transmission including a torque input member, an impeller assembly, a turbine assembly and a lock-up clutch assembly interposed between the turbine assembly and a torque input member. The torque converter further includes a torsional damper operatively interconnecting the turbine assembly and the lock-up clutch assembly. The torsional damper includes a plurality of reaction members integrally formed with a plurality of turbine blades and extending from the turbine shell and operatively coupled with the lock-up clutch assembly. The plurality of integrally formed reaction members define a predetermined spring rate such that torsional forces generated between the turbine assembly and the lock-up clutch assembly are damped through the flexing of the reaction members.

20 Claims, 4 Drawing Sheets

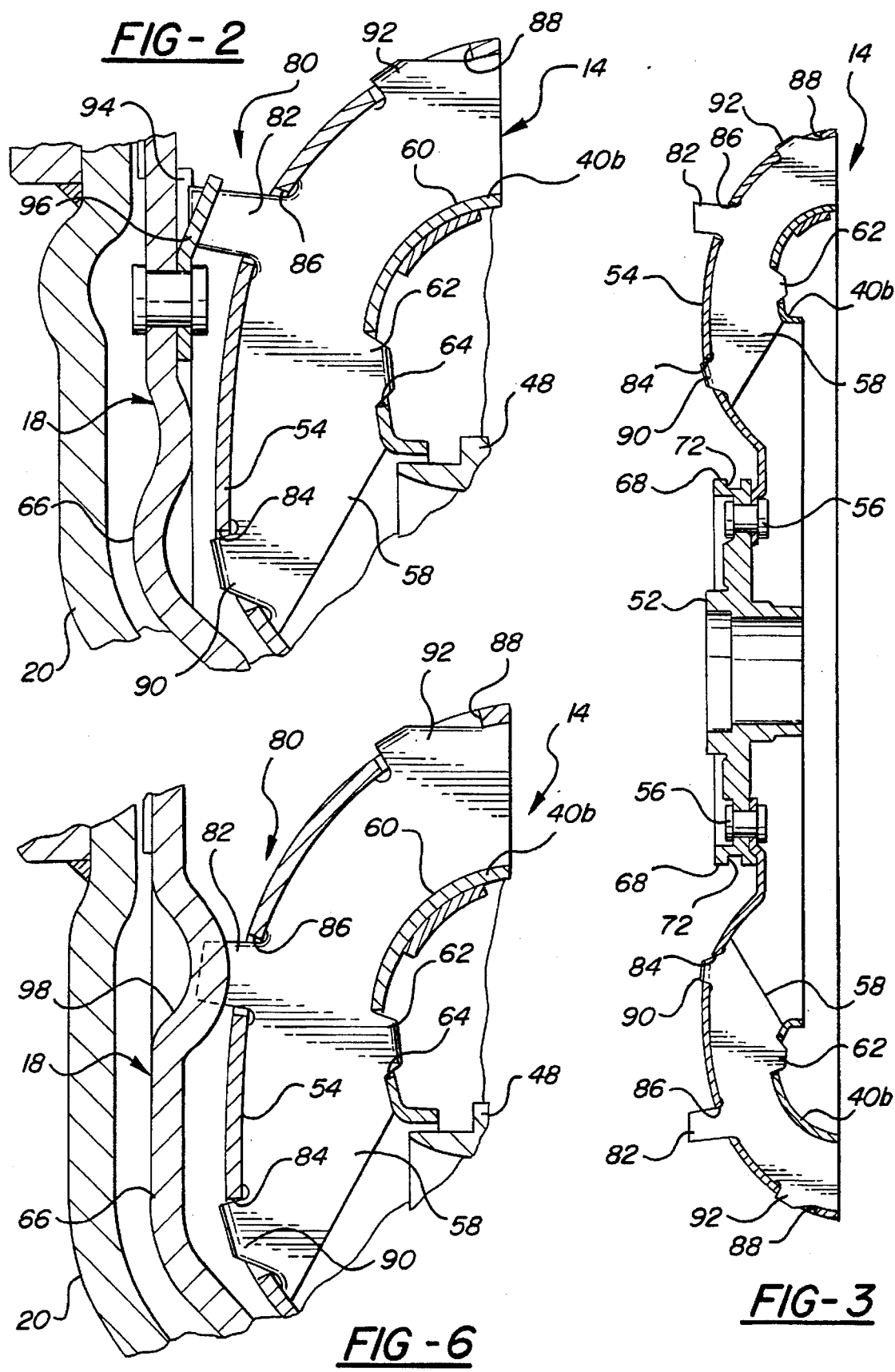

1

TORQUE CONVERTER HAVING TORSIONAL DAMPER

BACKGROUND OF THE INVENTION

1. Field of the Invention

The present invention relates, generally, to a torque converter and, more specifically, to a torque converter having a torsional damper.

2. Description of the Related Art

In automotive applications, engine torque and speed are translated between a prime mover, such as an internal combustion engine, to one or more wheels through the transmission in accordance with the tractive power demand of the vehicle. Torque converters are often employed between the internal combustion engine and its associated transmission.

Torsional damping mechanisms for torque converters are well known in the art. One torsional damping mechanism commonly employed in the related art includes a drive ring which forms an annular rearward facing channel and which is mounted to a lock-up piston in the torque converter. A plurality of coiled springs are carried in the channel of the drive ring and are engaged by a driven ring mounted to a turbine shell in the torque converter. The drive ring often includes lugs which are engaged by the coiled springs. This arrangement acts to dampen torsional vibrations due to impact loads and pulsations generated between the turbine and the piston of the lock-up mechanism in the torque converter.

However, conventional designs employed in this environment suffer from the disadvantage in that they require a significant amount of axial space and a relatively high number of components in addition to the typical components necessary to translate torque between the input member and the output of the torque converter. In addition, there is a continuous demand for cost reduction, weight reduction and efficiency improvements in the art of torsional damping mechanisms and torque converters.

Thus, there is a need in the art for a torque converter having a torsional damper which occupies less space and involves less components, results in cost and weight reduction over the conventional designs employed in the related art. In addition, there is a need in the art for improved operating parameters and increased efficiencies for such torque converters.

SUMMARY OF THE INVENTION

The present invention overcomes the disadvantages in the related art in a torque converter for translating torque from a prime mover to an input shaft of a transmission. The torque converter includes a torque input member and an impeller assembly operatively connected for rotation with the torque input member. A turbine assembly is fluidly connected in driven relationship with the impeller assembly. The turbine assembly includes a hub, a turbine shell mounted to the hub and a plurality of turbine blades carried by the turbine shell. A lock-up clutch assembly is supported for rotation with the turbine assembly and is interposed between the turbine assembly and the torque input member. The lock-up clutch assembly is moveable into engagement with the torque input member to provide direct torque translation between the torque input member and the turbine assembly.

The torque converter further includes a torsional damper operatively interconnecting the turbine assembly and the lock-up clutch assembly. The torsional damper includes a plurality of reaction members integrally formed with the plurality of turbine blades and extending through the turbine shell and operatively coupled with the lock-up clutch assembly. The plurality of integrally formed reaction members define a predetermined spring rate such that torsional forces generated between the turbine assembly and the lock-up clutch assembly are damped through the flexing of the reaction members.

In this way, the drive ring, coiled spring, driven ring and lugs of the conventional torsional damper are eliminated. Additional process operations and material employed to manufacture these components are also eliminated. This results in a desired cost and weight reduction. Furthermore, the torsional damper of the present invention occupies less axial space than conventional designs. Thus, the overall fit, form and function of the torque converter is improved over the related art which enhances and optimizes performance in this critical application where available space is at a premium.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 2 is an enlarged partial cross-sectional side view of the torsional damper of FIG. 1;

FIG. 3 is a cross-sectional side view of the turbine assembly of the present invention;

FIG. 6 is an enlarged, partial cross-sectional side view illustrating the torsional damper of FIG. 5.

DESCRIPTION OF THE PREFERRED EMBODIMENT(S)

Figure 1:
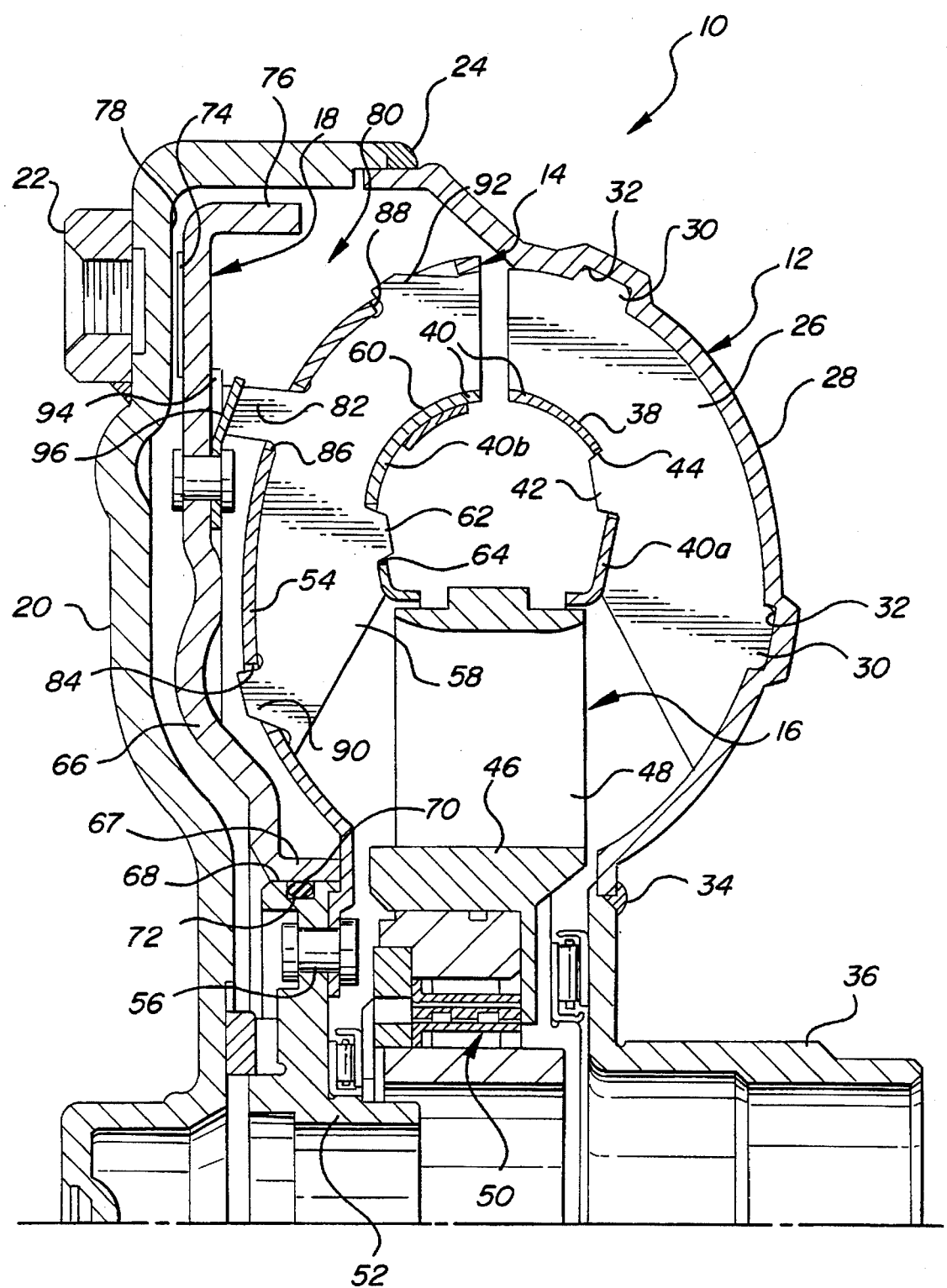
FIG. 1 is a cross-sectional side view of a torque converter having a torsional damper according to the present invention.

Referring now to the Figures, where like numerals are used to describe like structure, a hydrodynamic torque converter for translating torque from a prime mover such as an internal combustion engine (not shown) to the input shaft of a transmission is generally shown at 10. The transmission may then subsequently distribute this power to one or more wheels (not shown) through other drive train components such as a drive shaft and an axle having a differential (also not shown). While the torque converter illustrated in the Figures is particularly adapted for use with an automotive vehicle, those skilled in the art will understand that the torque converter may be employed in connection with other types of transmissions.

The torque converter 10 includes an impeller assembly, generally indicated at 12, a turbine assembly generally indicated at 14, a stator assembly, generally indicated at 16, and a lock-up clutch assembly, generally indicated at 18. Each of these assemblies will be described in greater detail below.

Power is transmitted from the rotating crank shaft (not shown) of the engine to a torque input member or front cover 20 of the torque converter. The front cover 20 may include a plurality of input drive lugs or threaded connectors 22. A rotatable plate member (not shown) is typically secured to the front cover member 20 by suitable fastening means such as bolts (not shown) which are received in the connectors 22 as is commonly known in the art. The front cover 20 is secured, typically by welding as indicated at 24, to the impeller assembly 12 of the hydrodynamic torque converter 10.

The impeller assembly 12 is fluidly connected in torsional flow relationship in a known manner with the turbine assembly 14 and the stator assembly 16. The impeller assembly 12 includes a plurality of annularly space impeller blades 26 connected to the inside of an impeller shell 28. To this end, the impeller blades 26 include a plurality of projections 30 which are fixedly received in corresponding notches 32 in the inside surface of the impeller shell 28. The impeller shell 28 is fixed, as for example by welding at 34, to an impeller hub or pump drive shaft 36. The impeller hub 36 may drive a pump (not shown) from which fluid is supplied to the hydrodynamic torque converter 10. The impeller blades 26 have an arcurate inner portion 38 which is fixed to one half 40a of a split core ring 40 through the interaction of wings 42 received in corresponding slots 44 of the ring 40. The structure of the split core ring 40 aids in directing fluid flow within the hydrodynamic torque converter 10 as is commonly known in the art.

The stator assembly 16 is interposed between the impeller assembly 12 and the turbine assembly 14 and includes a stator hub 46 and a plurality of stator vanes 48 spaced circumferentially about the stator hub 46. The stator assembly 16 includes a one way clutch assembly, generally indicated at 50, for allowing the stator hub 46 and the stator vanes 48 to rotate in the direction of rotation of the impeller assembly 12 and the turbine assembly 14 and lock in the opposite rotational direction.

The turbine assembly 14 is fluidly connected in driven relationship with the impeller assembly 12. The turbine assembly 14 includes an annular turbine hub 52 which is operatively connected to the input of the transmission. A turbine shell 54 is mounted to the turbine hub 52 via rivets 56 or some other suitable fastener. A plurality of turbine blades 58 are carried by the turbine shell 54 as will be described in greater detail below. As with the impeller blades 26, the turbine blades 58 include arcuate inner portions 60 which are fixed to the other half 40b of the split core ring 40 through the interaction of wings 62 received in corresponding slots 64 in the ring 40b.

The lock-up clutch assembly 18 is supported for rotation with the turbine assembly 14 and interposed between the turbine assembly 14 and the torque input member or front cover 20. The lock-up clutch assembly 18 includes an annular piston 66 having an inner flange 67. The turbine hub 52 presents an annular surface 68 corresponding to the inner flange 67. A sealing member, such as a gasket 70 is disposed in an annular notch 72 in the annular surface 68. An annular, disk shaped frictional element 74 is carried proximate to the outer peripheral flange 76 of the piston 66. The piston 66 is rotatably supported for axial movement on the annular surface 68 of the turbine hub 52 into and out of engagement with the inner surface 78 of the front cover 20 to provide direct torque translation between the front cover 20 and the turbine assembly 14 as will be discussed in greater detail below.

The hydrodynamic torque converter 10 further includes a torsional damper, generally indicated at 80, which operatively interconnects the turbine assembly 14 and the lock-up clutch assembly 18. The torsional damper acts to dampen torsional vibrations due to impact loads and pulsations generated between the turbine assembly 14 and the piston 66 of a lock-up clutch assembly 18 in the torque converter. The torsional damper 80 includes a plurality of reaction members 82 integrally formed with the plurality of turbine blades 58 and extending through the turbine shell 54 and operatively coupled with the lock-up clutch assembly 18. The integrally formed reaction members 82 define a predetermined spring rate such that torsional forces generated between the turbine assembly 14 and a lock-up clutch assembly 18 are damped through the flexing of the reaction members 82. More specially, the reaction members 82 are made of thin, spring steel which, in the embodiment illustrated in the Figures, are substantially rectangular in cross-section. Whatever the geometric shape in cross-section the reaction members 82 have a progressive spring rate for providing a predetermined amount of relative movement between the turbine assembly 14 and the lock-up clutch assembly 18.

Figure 4:
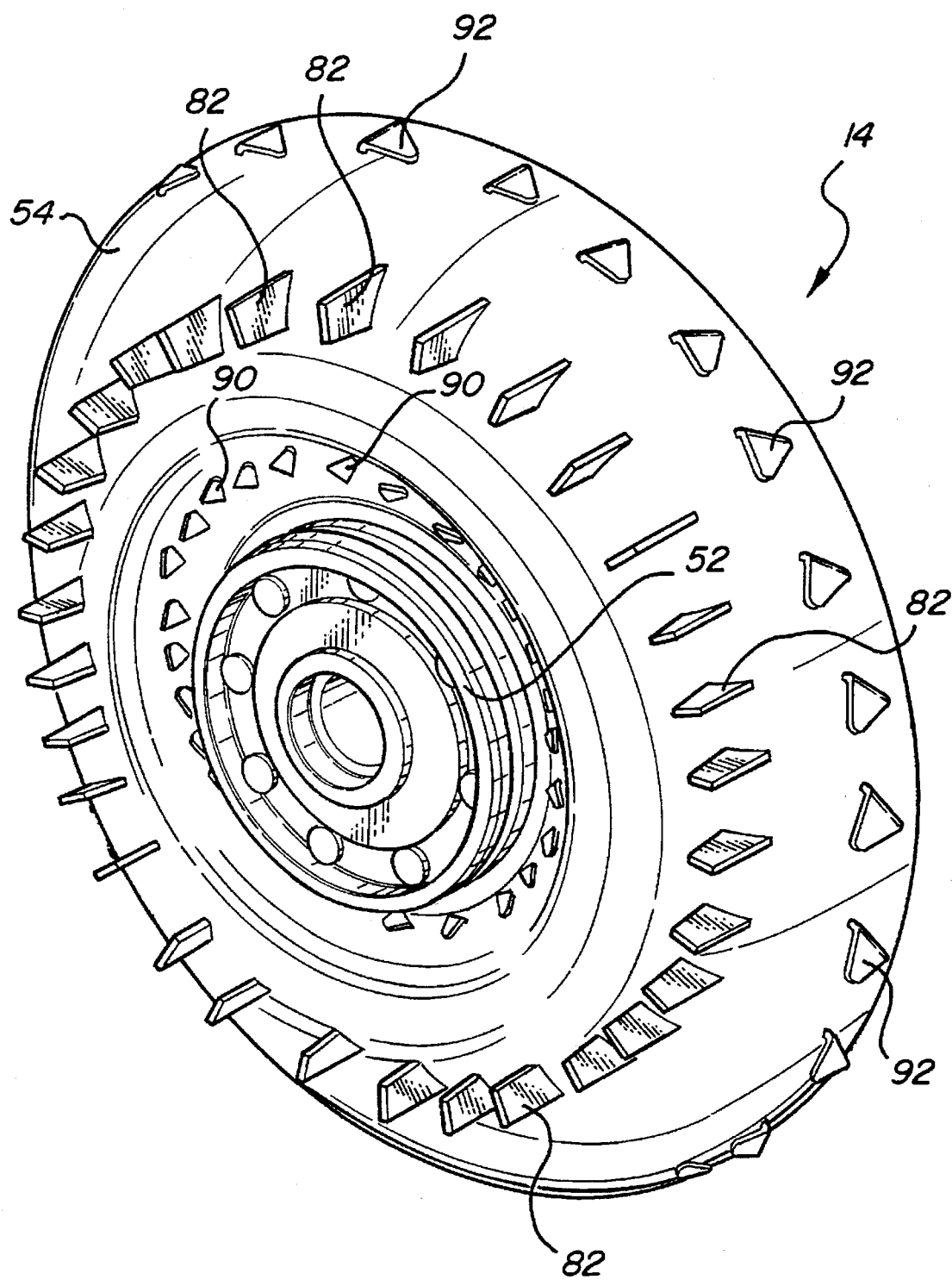
FIG. 4 is a perspective view of the turbine assembly of the present invention.

As best shown in FIG. 4, the plurality of reaction members 82 are spaced with respect to each other and are disposed annularly about the turbine hub 52. The turbine shell 54 includes a plurality of apertures 84,86,88 spaced relative to one another. The integrally formed reaction members 82 may extend through any of the groups of apertures 84,86,88 and between the turbine shell 54 and the lock-up clutch assembly 18. More specifically, the turbine shell 54 is semitoroidal in shape and includes a series of radially spaced apertures 84,86,88 wherein the apertures in each of the series 84,86,88 are spaced relative to one another and disposed annularly about the turbine hub 52. The reaction members 82 extend through at least one of the series 84,86,88 of annularly space apertures. In one embodiment, the reaction members 82 extend through one of the series 86 of annularly spaced apertures which is located in between the other two series 84,81 of apertures. In another embodiment, the reaction members 82 may extend through one of the series 84 of annularly spaced apertures disposed radially closest to the turbine hub 52.

The turbine blades 58 include a series of annularly spaced flanges 90,92 corresponding to at least some of the series 84,86,88 of annularly spaced apertures. The flanges 90,92 extend through the apertures 84,88 and are bent at angles relative to the turbine blades 58 to fix the turbine blades 58 relative to the turbine shell 54.

As best shown in FIGS. 1 and 2, the lock-up clutch assembly 18 includes an annular drive plate 94 mounted to the piston 66. The drive plate 94 includes a plurality of offset tabs 96 formed integrally with the drive plate 54 and the offset tabs 96 are bent at an angle relative to the plane of the annular drive plate 94 spaced relative to one another. The offset tabs 96 correspond to and are engaged by the plurality of reaction members 82 to couple the piston 66 to the turbine assembly 14.

Figure 5:
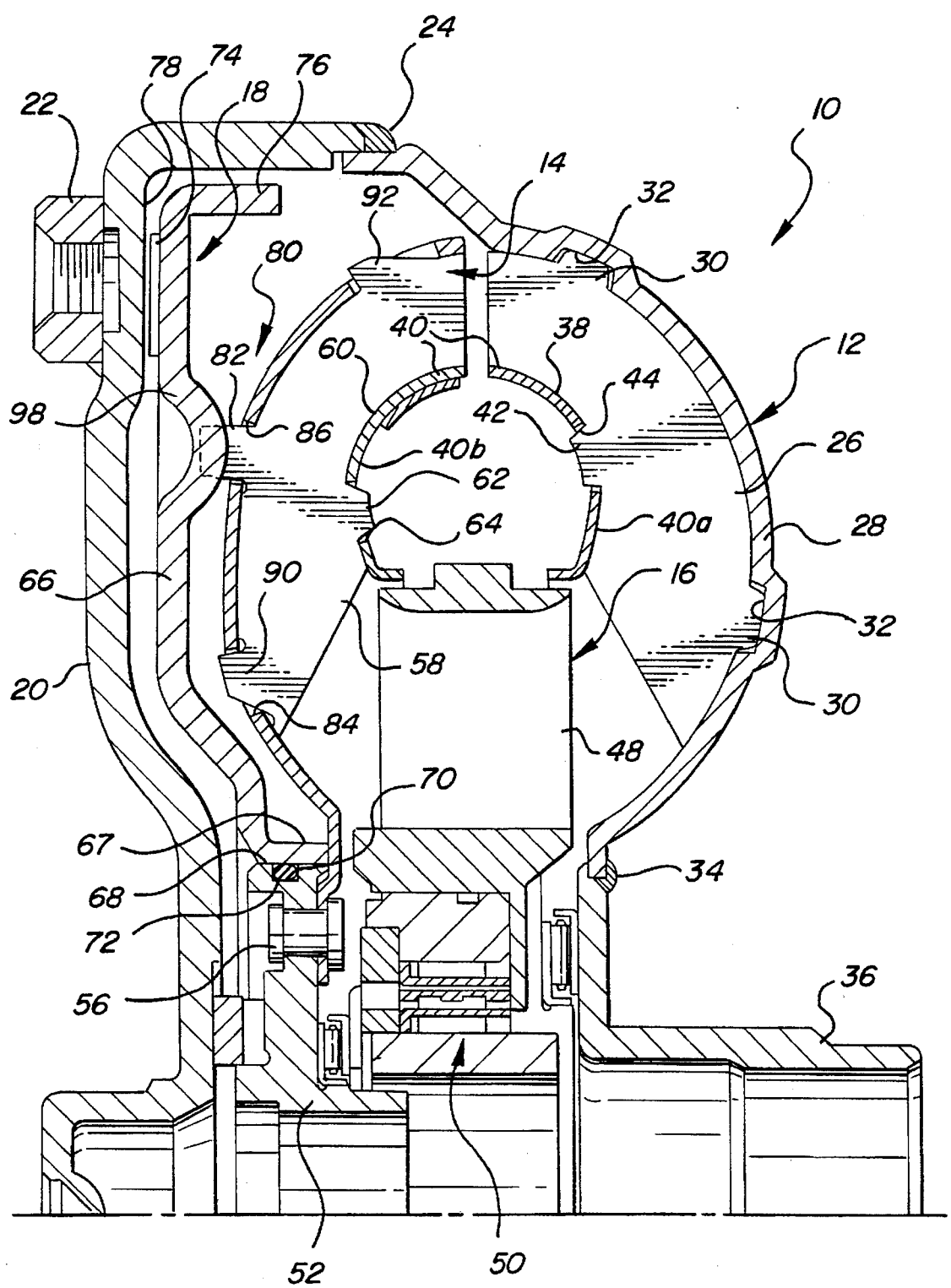
FIG. 5 is a cross-sectional side view of a torque converter illustrating an alternate embodiment of the torsional damper of the present invention.

Alternatively, and as best shown in FIGS. 5 and 6, the drive plate 94 may be eliminated and, instead, the piston 66 includes a plurality of offset portions 98 integrally formed on the piston 66 and spaced relative to one another. The offset portions 98 extend toward, correspond to and are engaged by the plurality of reaction members 82 to couple the piston 66 to the turbine assembly 14.

OPERATION OF THE TORQUE CONVERTER AND TORSIONAL DAMPER

Rotation of the crank shaft of the engine causes the front cover 20 to rotate with it through the actuation of the plate member (not shown). The front cover 20 is welded at 24 to the impeller shell 28 and so the impeller assembly 12 also rotates with the crankshaft. The fluid within the impeller assembly 12 is set into motion by the rotation of the impeller assembly 12 which is kept filled by the fluid pressure from a pump (not shown). The impeller blades 26 start to carry the fluid around with them. As the fluid is spun around by the impeller blades 26, it is thrown outward by centrifugal force and into the turbine assembly 14 at an angle. The fluid strikes the turbine blades 58 of the turbine assembly 14, thus imparting torque or turning effort to the turbine assembly 14 and causing the turbine shell 54 to rotate. The turbine shell 54 is connected by rivets 56 to the turbine hub 52. The turbine hub 52 is, in turn, operatively connected to the input of the transmission.

During normal downshifted operation of the hydrodynamic torque converter 10, piston 66 of the lock-up clutch assembly 18 is not applied. Thus, torque is imparted to the input of the transmission via the turbine assembly 14. However, during normal upshifted operation of the hydrodynamic torque converter 10 of the present invention, the piston 66 is applied. Fluid pushes the piston 66 against the front cover 20 with the friction disk 74 sandwiched between the two elements. The flow of power or engine torque is then transmitted through the front cover 20, the lock-up piston 66 directly to the turbine hub 52 and thus the input to the transmission. Thus, the front cover 20, lock-up clutch assembly 18, turbine assembly 14 and the input to the transmission rotate together.

The actuation of the piston 66 into engagement with the front cover 20 generates impact loads, pulsations and thus vibration between the turbine assembly 14 and the piston 66. The torsional damper 80 acts to dampen these forces. To that end, the reaction members 82 have a predetermined spring rate such that the reaction members flex and dampen these forces. As noted above, the reaction members 82 are made of thin, spring steel which, in one embodiment, may be substantially rectangular in cross-section and have progressive spring rates for providing a predetermined amount of relative movement between the turbine assembly 14 and the lock-up clutch assembly 18. The spring rate of the reaction members 82 is a function of the spring constant and will vary with the material and shape (length, width, height, thickness) of the reaction members 82. Further, the overall damping effect depends on the number of reaction members 82 employed in the torsional damper 80. The reaction members 82 may be located at a plurality of positions radially relative to the turbine hub 52 and the material and shape of the reaction members 82 may vary depending on this location. In this way, the torsional damper 80 of the present invention may be "tuned" depending the damping required in the torque converter.

Thus, the hydrodynamic torque converter 10 the present invention includes a torsional damper 80 which effectively dampens vibrations between the turbine assembly 14 and the lock-up clutch assembly 18 and achieves this favorable result while, at the same time, reducing the number of elements required for this operation. This results in a desired cost and weight reduction. Furthermore, the torsional damper of the present invention occupies less axial space than conventional designs. The overall fit, form and function of the torque converter is improved over the related art. The present invention enhances and optimizes performance in this critical application where available space is at a premium.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What we claim is:

1. A torsional damper operatively interconnecting a turbine assembly and a lock-up clutch assembly in a torque converter, said torsional damper comprising:

a plurality of reaction members integrally formed as extensions on a plurality of turbine blades extending through a turbine shell and operatively coupled with the lock-up clutch assembly, said plurality of integrally formed reaction members defining a predetermined spring rate such that torsional forces generated between the turbine assembly and the lock-up clutch assembly are damped through the flexing of each of said plurality of reaction members.

2. A torsional damper as set forth in claim 1 wherein said plurality of reaction members are spaced with respect to each other.

3. A torsional damper as set forth in claim 1 wherein each of said plurality of reaction members are made of thin, spring steel which is substantially rectangular in cross-section and having a progressive spring rate for providing a predetermined amount of relative movement between the turbine assembly and the lock-up clutch assembly.

4. A torque converter for translating torque from a prime mover to an input shaft of a transmission, said torque converter comprising:

a torque input member and an impeller assembly operatively coupled for rotation with said torque input member;

a turbine assembly fluidly connected in driven relationship with said impeller assembly, said turbine assembly including a turbine hub, a turbine shell mounted to said turbine hub and a plurality of turbine blades carried by said turbine shell;

a lock-up clutch assembly supported for rotation with said turbine assembly and interposed between said turbine assembly and said torque input member, said lock-up clutch assembly moveable into engagement with said torque input member to provide direct torque translation between said torque input member and said turbine assembly;

a torsional damper operatively interconnecting said turbine assembly and said lock-up clutch assembly, said torsional damper including a plurality of reaction members integrally formed with said plurality of turbine blades and extending through said turbine shell and operatively coupled with said lock-up clutch assembly, said plurality of reaction members defining a predetermined spring rate such that torsional forces generated between said turbine assembly and said lock-up clutch assembly are damped through the flexing of each of said plurality of reaction members.

5. A torque converter as set forth in claim 4 wherein said plurality of reaction members are spaced with respect to each other and are disposed annularly about said turbine hub.

6. A torque converter as set forth in claim 4 wherein said turbine shell includes a plurality of apertures spaced relative to one another, said plurality of reaction members extending through said plurality of apertures and between said turbine shell and said lock-up clutch assembly.

7. A torque converter as set forth in claim 4 wherein said turbine shell is semitoroidal in shape and includes a series of radially spaced apertures wherein the apertures in each of said series are spaced relative to one another and disposed annularly about said turbine hub said plurality of turbine blades including a series of annularly spaced flanges corresponding to at least some of said series of annularly spaced apertures and extending therethrough and bent at an angle relative to said turbine blades to fix said turbine blades relative to said turbine shell.

8. A torque converter as set forth in claim 7 wherein said plurality of reaction members extend through at least one of said series of annularly spaced apertures.

9. A torque converter as set forth in claim 7 wherein said plurality of reaction members extend through at least one of said series of annularly spaced apertures disposed radially closest to said turbine hub.

10. A torque converter as set forth in claim 4 wherein said lock-up clutch assembly includes an annular piston rotatably supported for axial movement on said turbine hub.

11. A torque converter as set forth in claim 10 wherein said lock-up clutch assembly includes a drive plate mounted to said piston, said drive plate including a plurality of offset tabs spaced relative to one another, said plurality of offset tabs corresponding to and engaged by said plurality of reaction members to couple said piston to said turbine assembly.

12. A torque converter as set forth in claim 10 wherein said piston includes a plurality of offset portions integrally formed on said piston and spaced relative to one another, said plurality of offset portions corresponding to and engaged by said plurality of reaction members to couple said piston to said turbine assembly.

13. An automotive transmission comprising:

an input shaft, a torque converter for translating torque from a prime mover to said input shaft of said transmission, said torque converter including a torque input member and an impeller assembly operatively coupled for rotation with said torque input member;

a turbine assembly fluidly connected in driven relationship with said impeller assembly, said turbine assembly including a turbine hub, a turbine shell mounted to said turbine hub and a plurality of turbine blades carried by said turbine shell;

a lock-up clutch assembly supported for rotation with said turbine assembly and interposed between said turbine assembly and said torque input member, said lock-up clutch assembly moveable into engagement with said torque input member to provide direct torque translation between said torque input member and said turbine assembly;

a torsional damper operatively interconnecting said turbine assembly and said lock-up clutch assembly, said torsional damper including a plurality of reaction members integrally formed with said plurality of turbine blades and extending through said turbine shell and operatively coupled with said lock-up clutch assembly, said plurality of reaction members defining a predetermined spring rate such that torsional forces generated between said turbine assembly and said lock-up clutch assembly are damped through the flexing of each of said plurality of reaction members.

14. A torque converter as set forth in claim 13 wherein said turbine shell includes a plurality of apertures spaced relative to one another, said plurality of reaction members extending through said plurality of apertures and between said turbine shell and said lock-up clutch assembly.

15. A torque converter as set forth in claim 13 wherein said turbine shell is semitoroidal in shape and includes a series of radially spaced apertures wherein the apertures in each of said series are spaced relative to one another and disposed annularly about said turbine hub, said plurality of turbine blades including a series of annularly spaced flanges corresponding to at least some of said series of annularly spaced apertures and extending therethrough and bent at an angle relative to said turbine blades to fix said turbine blades relative to said turbine shell.

16. A torque converter as set forth in claim 15 wherein said plurality of reaction members extend through at least one of said series of annularly spaced apertures.

17. A torque converter as set forth in claim 15 wherein said plurality of reaction members extend through at least one of said series of annularly spaced apertures disposed radially closest to said turbine hub.

18. A torque converter as set forth in claim 13 wherein said lock-up clutch assembly includes an annular piston rotatably supported for axial movement on said turbine hub.

19. A torque converter as set forth in claim 18 wherein said lock-up clutch assembly includes a drive plate mounted to said piston, said drive plate including a plurality of offset tabs spaced relative to one another, said plurality of offset tabs corresponding to and engaged by said plurality of reaction members to couple said piston to said turbine assembly.

20. A torque converter as set forth in claim 18 wherein said piston includes a plurality of offset portions integrally formed on said piston and spaced relative to one another, said plurality of offset portions corresponding to and engaged by said plurality of reaction members to couple said piston to said turbine assembly.

* * * * *